(12) United States Patent
Bullis et al.

(10) Patent No.: US 7,459,421 B2
(45) Date of Patent: Dec. 2, 2008

(54) CLEANING AND CONDITIONING COMPOSITION AND METHOD

(75) Inventors: Jeffrey Gordon Bullis, Aurora, CO (US); Jonathan E. Michel, Huntersville, NC (US)

(73) Assignee: J&J Marketing, LLC, Aurora, CO (US)

( * ) Notice: Subject to any disclaimer, the term of this patent is extended or adjusted under 35 U.S.C. 154(b) by 422 days.

(21) Appl. No.: 11/145,492

(22) Filed: Jun. 3, 2005

(65) Prior Publication Data

US 2006/0276361 A1    Dec. 7, 2006

(51) Int. Cl.
*C11D 7/12* (2006.01)
*C11D 7/14* (2006.01)
*C11D 3/08* (2006.01)
*C11D 3/10* (2006.01)
*B08B 7/00* (2006.01)

(52) U.S. Cl. .......... 510/240; 510/365; 510/477; 510/507; 510/509; 134/2; 134/42

(58) Field of Classification Search .......... 510/240, 510/507, 509, 365, 477; 134/2, 42
See application file for complete search history.

(56) References Cited

U.S. PATENT DOCUMENTS

| 4,615,821 | A | * | 10/1986 | Siklosi ............ 510/368 |
| 5,723,424 | A | | 3/1998 | Jennings |
| 5,725,795 | A | * | 3/1998 | Kashiba .......... 252/188.28 |
| 5,775,259 | A | * | 7/1998 | Tucker ............ 119/173 |
| 5,944,704 | A | * | 8/1999 | Guarracino et al. ...... 604/359 |
| 5,990,067 | A | | 11/1999 | Franssen et al. |
| 6,635,609 | B2 | | 10/2003 | Sutton |

FOREIGN PATENT DOCUMENTS

| JP | 55129064 A | * | 10/1980 |
| JP | 62298364 A | * | 12/1987 |
| JP | 01155857 A | * | 6/1989 |

* cited by examiner

*Primary Examiner*—Lorna M Douyon
(74) *Attorney, Agent, or Firm*—The Reilly Intellectual Property Law Firm, P.C.; Ellen Reilly

(57) ABSTRACT

A cleaning composition and method for the removal of contaminants, such as, oil and grease from a surface, particularly concrete and asphalt. The composition includes an absorptive material, charcoal, and a pH modifying agent which is applied and removed in a dry form. Optionally, surfactant, solvent, carbonate or microorganisms may be added.

21 Claims, No Drawings

CLEANING AND CONDITIONING COMPOSITION AND METHOD

BACKGROUND AND FIELD

The present invention relates to surface cleaning and contaminant absorption compositions and more particularly to improved concrete and asphalt conditioning compositions that are applied in a dry form, removed in a dry form and are environmentally friendly.

The present compositions are designed as concrete and asphalt conditioners and cleaners. Concrete surfaces tend to be porous allowing for oil, grease and other contaminants to adhere to the surface making these surfaces difficult to clean. Asphalt, on the other hand, is less porous than concrete but asphalt contains tar and oil which will be broken down if strong cleaning agents are used. The removal of oil, grease and dirt from a surface, particularly concrete or asphalt surfaces, such as, garage floors, drive-throughs for banks and restaurants as well as parking lots, has become a major problem in the United States. Prior art has made use of clay as a cleaning material. See U.S. Pat. No. 5,723,424 to Jennings. Clay, which is typically a form of cat litter, once removed leaves a residue on the surface. Clay and other cleansers are difficult to use, and may not be environmentally safe. Washing grease, oil, gasoline, antifreeze or any other contaminants into the storm drain has damaging effects on our eco-system. Pressure washing any detergents, degreasers and even biodegradable agents, used to clean these fluids into the street and subsequently into the storm water system has become illegal. The present invention relates to surface cleaning and conditioning compositions which are applied in a dry form, compositions are applied with a bristle broom and the excess residue is removed in dry form. The compositions are lightweight, easy to work with and avoid the messy clean up involved with liquid cleansers or dry cleansers that require the application of water.

Studies have shown that water acts as a catalyst for these agents causing toxic build-up. The Federal EPA has written pages of mandates and regulations against such activity. State and local authorities have also incorporated these laws to stop contaminants from entering state waters. The EPA on federal, state and local levels are enforcing these laws with large fines on those who disregard them. Another issue is the use of water. In many states, water has become a precious commodity. Conservation of water is becoming mandated and also governed by fines if misused.

In short, it is illegal to wash any oil, gasoline, antifreeze, detergents, etc. into the storm drain. There is a need for a surface conditioning and cleaning composition that is simple to manufacture, easy to apply and remove from a surface and is environmentally friendly.

SUMMARY

In accordance with the present embodiments, there is provided a cleaning composition for the removal of contaminants from a surface wherein the composition is applied to a designated surface area from which contaminants are to be removed, the composition comprising major proportions by weight of an absorptive agent, and minor proportions by weight of charcoal, and a pH-modifying agent. In one embodiment the surface cleaning and conditioning composition for concrete is made up of silicate, fly ash, a carbonate, charcoal, a surfactant and a pH-modifying agent. Microorganisms and colorants are optional. Another embodiment for an asphalt conditioning composition includes fly ash, charcoal, a solvent, a pH-modifying agent and microorganisms. The present concrete and asphalt cleaning and conditioning compositions are environmentally friendly due to their neutral pH. They are easy to apply and remove and do not require the use of any type of wetting agent, such as, water.

The above and other objects, advantages and features of the present embodiments will become more readily appreciated and understood from a consideration of the following detailed description of preferred and modified forms of the present embodiment when taken together with the accompanying drawings in which:

DETAILED DESCRIPTION

A novel and improved surface conditioning and cleaning composition according to the present embodiments includes major proportions by weight of an absorptive material, to be described in detail, and minor proportions by weight of charcoal, a solvent and a pH-modifying substance. These are the essential ingredients which perform specific functions in our composition.

A first embodiment is a concrete cleaning and conditioning composition which is in the form of a powder that is typically spread onto a concrete surface but may also be used for other surfaces.

Our concrete cleaning mixture contains a form of silicate, fly ash, a carbonate, charcoal, a surfactant and a pH-modifying substrate. Major proportions by weight of silicate and/or fly ash are added to the mixture. Preferably, the proportion by weight should be in the range of 20% to 80% of silicate and 20% to 80% of fly ash with the resultant silicate and/or fly ash mixture having a total weight of 80%. This proportion will vary depending on whether it is desired to have 80% silicate, an 80% mixture of silicate and fly ash or 80% fly ash.

The silicates which are divided into different classes by their structures, such as, hydrous aluminum silicates or phyllosilicates are typically used in our compositions. Zeolite®, clinoptilolite and other members of the Zeolite® family including any within the framework of silicates having an exchanging cation, for example, amicite, shabazite, pistilbite, ferrierite, gobbinisite and mazzite, to name a few, are absorptive or absorbing agents. These are not listed by way of limitation but only for example. Zeolite's color combined with the other ingredients gives it coloration without the use of artificial pigments. Zeolite® has a chemical name of potassium-calcium-sodium-aluminosilicate. One producer of this is Bear River Zeolite Corporation, Thompson Falls, Mont. It is part of the hydrous aluminum silicates chiefly found in igneous rocks and characterized by a ready loss or gain of water. Zeolites are used as molecular sieves to separate mixtures because they are capable of selective absorption and are a microporous material that is capable of absorbing and encapsulating other agents. One of its functions is similar to that of microorganisms, but instead of digesting contaminants, it rather imprisons them. They have a high ion exchange capacity and can be used to separate petrol, benzene and toluene from low grade raw materials, such as, coal and methanol.

A second absorptive agent, fly ash, is the ash product which is exhausted through the smoke stack with combusting gases during coal combustion. Fly ash C is the preferable fly ash and produces a variety of qualities due to its very fine granular size, color, absorbency and chemical reactivity with Zeolite and calcium carbonate. When contaminants are dropped on our compositions, the fly ash helps hold them so they will not soak into the surface. After any moisture has evaporated, fly ash flakes on the surface rather than caking, giving it added cleaning and conditioning qualities.

Minor proportions by weight of the carbonates, charcoal, surfactant and pH-modifying agent are added to the mixture to form or concrete cleaning mixture. Preferably, the proportion of carbonates, charcoal, surfactant and pH modifying agent should be in the range of 5% to 40% of carbonate, 1% to 35% of surfactant and 0.5% to 10% pH-modifying agent. Use values are percentage by weight of the total weight. Microorganisms, coloring agents and kiln dust may also be added.

The carbonates are preferably selected from the group consisting of calcium carbonate, sodium carbonate, magnesium carbonate, sodium bicarbonate, and sodium percarbonate. Calcium carbonate is the most preferred carbonate and is an inorganic salt that is believed to work as a whitening and conditioning component. In combination, the calcium carbonate aids in absorbing and neutralizing acids on the affected surface. Deterioration occurs because acids are not friendly to the alkaline characteristics of concrete.

Activated charcoal or activated carbon is used and is an amorphous form of carbon. This means that it has no regular atomic structure. Activated charcoal is obtained by burning carbonaceous materials and heating with steam to approximately 1000° C. in the absence of oxygen. This treatment removes residual non-carbon elements and produces a porous internal microstructure having an extremely high surface area making it an ideal medium for the adsorption and absorption of organic chemicals. Activated carbon works as a very effective absorbent as well as a natural colorant for asphalt. Further, the activated carbon has odor control and purification properties. Activated carbon contains micropores making it an absorbent of fluids as well as gases.

The surfactant we use contains a hydrophillic and hydrophobic segment. The surfactants are in liquid form but do not significantly change the dry nature of our compositions. When added to water or solvents, a surfactant reduces the surface tension of the systems for emulsification. Surfactants increase the emulsification capacity of our compositions as well as binding the other ingredients together. Dust reduction is also an added benefit of the surfactant. The surfactant reduces the binding capacity and surface tension of oils, allowing for easy absorption from the concrete or asphalt surface and allows moisture to freely merge with rather than repel them as well as the other ingredients. Our compositions also bond with the pores of the surface rather than blowing or washing off. As an example, our composition uses Calsoft F-90 produced by The Pilot Chemical Company, Red Bank, N.J., U.S.A. Other surfactants including ionic and anionic surfactants may also be used.

A pH-modifying substance or agent is preferably selected from the group consisting of citric acid, sodium citrate and calcium citrate. These agents act as a neutralizing agent on the pH. A pH in the range of 6.5 to 9.0 is desirable. Most preferably, citric acid is used to modify the pH of the composition. Citric acid is important to modify the pH of the composition to a value of not less than 6.5 and not greater than 9.0. Being pH neutral is of primary interest should product run off in rain water. Small amounts of the pH-modifying agent are typically used resulting in a safe and effective product that meets environmental standards.

Microorganisms are used and may come in many forms, such as, bacteria, yeast and fungi. These microorganisms eat harmful chemicals and turn them into less toxic or non-toxic byproducts, such as, carbon dioxide, water and fatty acids. These microbes remain dormant until they come into contact with moisture and food, thereby enabling them to digest the contaminants and grow. Once the food source is gone, they become inactive again.

A more specific working example of the concrete cleaning composition is one which comprises major proportions by weight of Zeolite and optionally fly ash C, both acting as an absorbent. Minor proportions by weight are then added of calcium carbonate, activated charcoal, a surfactant and citric acid. Colorants, kiln dust and microorganisms may optionally also be added. Due to the fact that the concrete cleaning and conditioning composition is a powder, it infiltrates the pores of the surface and vigorously attaches to any moist contaminants. Once the concrete cleaning composition attaches to oil, antifreeze, gasoline and other contaminants, the cleaning process starts and the composition changes to a lighter color. Through the process of emulsification, our composition absorbs and holds contaminants while they are molecularly broken down.

Our asphalt conditioning composition is made up of fly ash, charcoal, a solvent, a pH-modifying substance and microorganisms. As discussed previously, fly ash possesses a variety of qualities due to its absorbent nature and color. The asphalt conditioning composition contains major proportions by weight of fly ash, preferably fly ash F which adds bulkiness to the mixture as well as an absorptive component. Charcoal or activated charcoal is also added which acts as a colorant to the composition as well as an effective absorbent.

The solvent, which is typically in liquid form, is added to the mixture to reduce the dust as well as reducing the binding capacity and surface tension of oils. The solvent is typically used in asphalt conditioning instead of a surfactant, i.e., any form of detergent, as it is not necessary on an asphalt surface. Any type of strong detergent will break down oil and grease which is a major component of asphalt, thereby deteriorating the surface. The solvent will not act to break down an asphalt surface. Organic solvents are utilized to substantially dissolve surface contaminants and the most preferred solvent is dipropylene glycol monomethyl or DPM produced by Arco Chemical.

A pH-modifying substance, such as, citric acid is added to our asphalt conditioning composition which acts to neutralize our conditioning composition mixture. Once again, a preferable range of pH is between 6.5 and 9.0 Finally, microorganisms are added to help with bioremediation. The microorganisms may take many forms, such as, bacteria, yeast and fungi. As discussed earlier, these microorganisms act to convert harmful chemicals into less toxic or non-toxic byproducts.

A working example of our asphalt conditioning composition consists of fly ash F, activated charcoal, a solvent, a mixture of fly ash F consisting of approximately 88%-90% of the total weight of the composition, charcoal consisting of approximately 9%-10% of the total weight of the composition, a solvent consisting of about 0.5%-1% of the total weight of the composition, 1% citric acid and 1% of microorganisms forming the remainder of the total weight of the composition. The asphalt conditioning composition is in the form of a powder that is spread on an asphalt surface. The conditioning composition saturates the surface of the asphalt and attaches to any moist contaminants. Once again, our composition absorbs and holds contaminants while they are molecularly broken down.

A major property of both the concrete and asphalt compositions involves emulsification and absorption. During emulsification, due to the surfactant or the solvent, oils are reduced to soluble solutions; similar to cleaning dishes with dish soap.

The binding capacity of oil is reduced through mild wetting agents. The contaminants are then encapsulated and absorbed by the absorbing agents.

Our compositions work by cleaning oil and grease from the surface by molecularly deactivating harmful hydrocarbon chains. Our composition is applied dry without the use of water and natural absorbents hold contaminants while they are molecularly broken down. Contaminants are reduced to organic compositions such as carbon dioxide, water and fatty acids.

Our compositions consist of a very fine powder leaving a residual coating on and in the pores of the surface. This protects and conditions the surface from the next oil drop by absorbing it before it can soak into the surface. Therefore, the surface is being cleaned prior to the next application. Instead of the existing stain enlarging, it is reduced and lightened. Cleaning with our compositions consequently lasts longer than traditional cleaning methods.

The present compositions also cover a large surface area. As with painting a house, our compositions cover stains and discoloration on the surface. The ingredients are blended to match and enhance the color of concrete and asphalt. This appearance lasts for a substantial period of time after application. A second chemical property of our compositions is the process of bioremediation through the use of microorganisms. Our conditioning and cleaning compositions are a blend of naturally occurring ingredients to insure a safe and effective product that meets environmental standards.

Application procedures are simple and easy: Our compositions are applied with a fine bristle broom. Specific types of brooms are an important part of correct application and other tools include scrapers, wire brushes, a sweeping broom and leaf blower. Our compositions can be applied at any time of the day or night or at any temperature. Hot or cold conditions do not affect their performance. Once applied, they attach to any contaminants and do not wash off easily. Our products continue to clean after rain has run off of the concrete or asphalt.

Our concrete cleaner covers surface areas of varying rates due to surface conditions. Average coverage rates are 1 lb. per 150 square feet.

Asphalt is different in that it contains oil and tar. This surface cannot be pressure-washed due to the fact that it pits and breaks up. Our asphalt conditioner protects and conditions the surface by reducing the damaging effect of automotive fluids. Parking spaces, drive-throughs and spill areas are generally the best target application areas.

Application steps are as follows for our concrete cleaner:
1. Apply our concrete cleaner in a thick line in front of the soiled area. One pound should cover approximately 150 square feet.
2. For the best results, a fine bristled broom is recommended to spread the product over the stained surface.
3. Spread the composition over the soiled area. Work the product back and forth until the surface is completely saturated and turns white. Sweep up the excess product.

Our concrete cleaner continues to clean and condition even with heavy traffic.

The application steps are as follows for our asphalt conditioner:
1. Apply our asphalt conditioner in a thick line in front of the soiled area.
2. For the best results, a fine bristled broom is recommended to spread the product over the stained surface.
3. Spread the composition over the soiled area. Work the product back and forth until stains are completely covered. Sweep up the excess product.

Our asphalt conditioner continues to clean and condition even with heavy traffic.

It is therefore to be understood that while preferred forms of invention are herein set forth and described, the above and other modifications may be made therein without departing from the spirit and scope of the invention as defined by the appended claims and reasonable equivalents thereof.

We claim:

1. A surface cleaning and contaminant absorption composition for concrete and asphalt consisting of:
   an absorbent selected from the group consisting of silicate fly ash, and mixtures thereof;
   a pH-modifying substance selected from the group consisting of citric acid, sodium citrate and calcium citrate;
   activated charcoal; and
   a solvent or surfactant.

2. The surface contaminant absorption composition according to claim 1 wherein said pH-modifying composition is added in an amount sufficient to adjust the pH of the composition to a value of not less than 6.5 but no greater than 9.0.

3. The surface contaminant absorption composition according to claim 1 wherein said absorbent is added in an amount sufficient to comprise major proportions by weight of the composition.

4. A surface cleaning composition for concrete consisting of:
   silicate;
   fly ash;
   a carbonate;
   charcoal;
   a surfactant; and
   a pH-modifying agent.

5. The surface cleaning composition according to claim 4 wherein said silicates are selected from the group of hydrous aluminum silicates.

6. The surface cleaning composition according to claim 4 wherein said fly ash is fly ash C or F.

7. The surface cleaning composition according to claim 4 wherein said carbonate is selected from the group consisting of calcium carbonate, sodium carbonate, magnesium carbonate, sodium bicarbonate and sodium percarbonate.

8. The surface cleaning composition according to claim 4 wherein said pH-modifying agent is selected from the group consisting of citric acid, sodium citrate and calcium citrate.

9. The surface cleaning composition according to claim 4 wherein said charcoal is activated charcoal.

10. A concrete surface cleaning composition consisting of:
    silicate, fly ash, a carbonate, charcoal, a surfactant, an organic salt and microorganisms;
    means for applying said composition in powdered form on said surface; and
    means for removing said composition from said surface.

11. The concrete surface cleaning composition of claim 10 wherein said applying means is a bristled broom.

12. A dry composition capable of cleaning concrete surfaces consisting of:
    phyllosilicate;
    fly ash C;
    calcium carbonate;
    activated charcoal;
    a surfactant;
    a pH-modifying agent in an amount sufficient to adjust the pH to a value of not less than 6.5 and no greater than 9.0; and
    microorganisms and coloring agents.

13. The dry composition according to claim 12 wherein said phyllosilicate is potassium-calcium-sodium-aluminosilicate.

14. The dry composition according to claim 12 wherein said pH-modifying agent is selected from the group consisting of sodium citrate, calcium citrate and citric acid.

15. An asphalt conditioning composition for the absorption of contaminants from a surface and conditioning of the same surface, said composition consisting of:
- fly ash;
- charcoal;
- a pH-modifying substance;
- a solvent; and
- microorganisms.

16. The asphalt conditioning composition according to claim 15 wherein said fly ash is fly ash F.

17. The asphalt conditioning composition according to claim 15 wherein said pH-modifying substance is selected from the group consisting of citric acid, sodium citrate and calcium citrate.

18. A method for conditioning and cleaning a surface using a dry composition according to claim 1, the method comprising the steps of:
- applying said dry composition to a limited area of a porous or nonporous surface;
- spreading said dry composition with a bristled broom along said limited area; and
- removing said dry composition from said limited area.

19. The method according to claim 18, said method further comprising scrubbing said surface with said broom after spreading said composition.

20. The method according to claim 18 wherein said method further comprising reusing unused portions of said dry composition on another designated area.

21. A method for conditioning asphalt, the method comprising the steps of:
- applying the composition according to claim 1, in a dry form to an asphalt surface;
- spreading said mixture; and
- removing said composition from said surface area.

* * * * *

UNITED STATES PATENT AND TRADEMARK OFFICE
CERTIFICATE OF CORRECTION

PATENT NO.         : 7,459,421 B2                                    Page 1 of 1
APPLICATION NO.    : 11/145492
DATED              : December 2, 2008
INVENTOR(S)        : Jeffrey Gordon Bullis and Jonathan E. Michel It is certified that error appears in the above-identified patent and that said Letters Patent is hereby corrected as shown below:

| Column No. | Line No. | Correction |
|---|---|---|
| 6 | 11 | Add a comma after the word silicate. |

Signed and Sealed this

Second Day of June, 2009

JOHN DOLL
*Acting Director of the United States Patent and Trademark Office*